Figure 1:
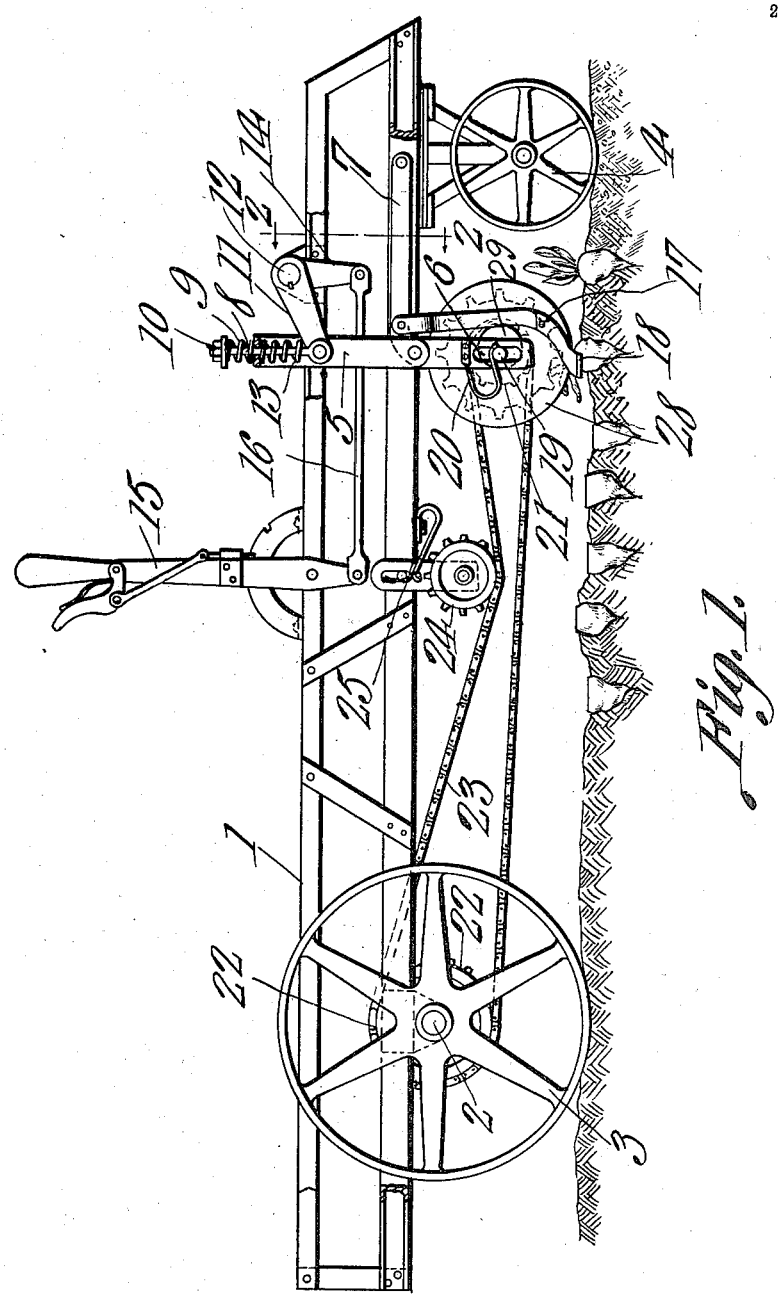

G. A. PINGREE.
BEET GAGE MEMBER AND TOPPER.
APPLICATION FILED NOV. 22, 1910.

1,045,074.

Patented Nov. 19, 1912.

2 SHEETS—SHEET 1.

Witnesses

George A. Pingree, Inventor by C. A. Snow & Co., Attorneys

G. A. PINGREE.
BEET GAGE MEMBER AND TOPPER.
APPLICATION FILED NOV. 22, 1910.
1,045,074.
Patented Nov. 19, 1912.
2 SHEETS—SHEET 2.
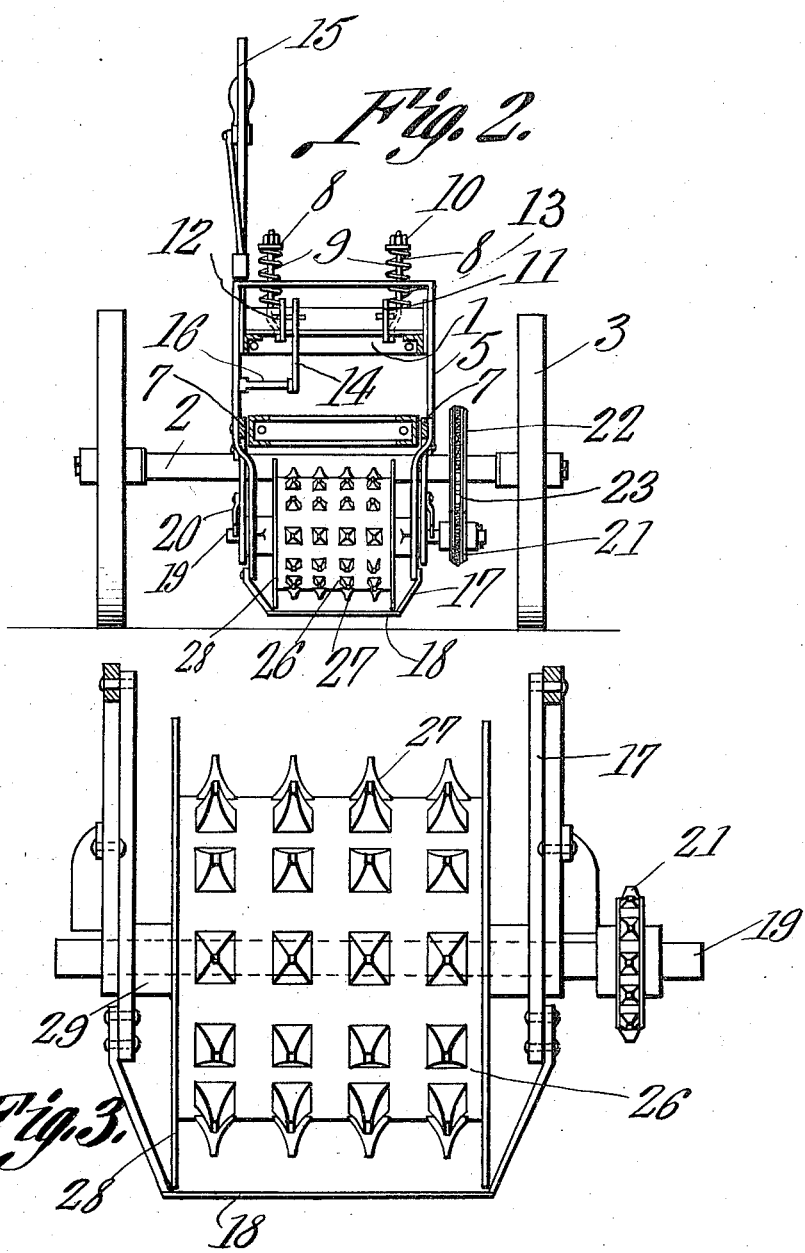
Witnesses
George A. Pingree, Inventor
by
Attorneys

UNITED STATES PATENT OFFICE.

GEORGE A. PINGREE, OF LAMAR, COLORADO.

BEET GAGE MEMBER AND TOPPER.

1,045,074.

Specification of Letters Patent.

Patented Nov. 19, 1912.

Application filed November 22, 1910. Serial No. 593,657.

*To all whom it may concern:*

Be it known that I, GEORGE A. PINGREE, a citizen of the United States, residing at Lamar, in the county of Prowers and State of Colorado, have invented a new and useful Beet Gage Member and Topper, of which the following is a specification.

This invention has relation to beet gage members and toppers and consists in the novel construction and arrangement of its parts as hereinafter shown and described.

The object of the invention is to provide a simple topping and gaging mechanism adapted to be used upon a beet harvester and which is positively operated from one of the supporting wheels and having its parts so assembled that the tops of the beets will be cut at a uniform distance from their upper ends irrespective of their positions in the soil.

In the accompanying drawings,—Figure 1 is a side elevation of a portion of the frame of a beet harvester with parts broken away showing the gage member and topper applied thereto. Fig. 2 is a transverse sectional view of the frame of the harvester cut on the line 2—2 of Fig. 1. Fig. 3 is an enlarged front elevation of the gaging and topping mechanisms of the device.

As illustrated in the accompanying drawings 1 indicates the frame of the harvester which is mounted at its rear portion upon an axle 2. Said axle 2 in turn is supported upon traction wheels 3. A wheel mounted truck 4 supports the forward portion of the frame 1.

A vertically slidable yoke 5 is located at the forward portion of the frame 1 and is provided in the vicinity of its lower end with vertically disposed elongated slots 6. Arms 7 are pivotally connected at their forward ends with the sides of the frame 1 and are pivotally connected at their rear ends with the sides of the yoke 5. A bolt 8 is vertically disposed and passes through the upper intermediate portion of the yoke 5 and a spring 9 is interposed upon the upper portion of the bolt 8 which carries the nut 10 and the upper side of the yoke 5. Arms 11 are connected to a rock shaft 12 which is journaled upon the frame 1 and coiled springs 13 surround the lower portions of the bolts 8 and are interposed between the under surface of the intermediate portion of the yoke 5 and the rear ends of the arms 11. An arm 14 is fixed to the rock shaft 12. A lever 15 is fulcrumed upon the frame 1 and the working end of the said lever is pivotally connected with the arm 14 by means of a rod 16. Therefore it will be seen that as the said lever 15 is swung, the rod 16 will be moved longitudinally and through the arm 14 the shaft 12 will be rocked in its bearings and the arms 11 will be raised or lowered at their rear ends whereby the yoke 5 may be raised or lowered and held resiliently in such adjusted position.

Hangers 17 are pivotally connected at their upper ends with the rear end portions of the arms 7 and the lower portions of the said hangers are rearwardly curved as clearly illustrated in Fig. 1 of the drawings. A knife or topping blade 18 is secured at its ends to the lower ends of the hangers 17. A shaft 19 is journaled for rotation in the elongated slots 6 provided at the ends of the yoke 5 and is held resiliently in a lowermost position in the said slots by means of springs 20 which are secured at their ends to the end portions of the yoke and bear at their free ends against the upper portion of the said shaft 19. A sprocket wheel 21 is fixed to the shaft 19 and a sprocket wheel 22 is fixed to the axle 2. A sprocket chain 23 passes around the sprocket wheels 21 and 22 and is adapted to transmit rotary movement from the axle 2 to the shaft 19 and its attachments. A slack absorber 24 is mounted upon the frame 1 and bears against the upper run of the said chain 23 and is under tension of a spring 25 which has a tendency to hold the said slack absorber in a lowermost position whereby the said chain 23 is kept at a proper degree of tension.

A cylinder 26 is concentrically mounted upon the shaft 19 and is provided upon its periphery with a series of approximately pyramidoidal teeth 27. Vertically disposed parallel disks 28 are fixed to the ends of the cylinder 26, cams 29 are fixed to the shaft 19 and the rear edge portions of the hangers 17 are located in the paths of movement of the cams whereby the said hangers are moved in forward directions as the shaft 19 rotates. The forward or cutting edge of the blade 18 is located behind a plane passing vertically through the center of the shaft 19.

In operation the device works as follows. The lever 15 is swung so that the lower end portion of the yoke 5 is positioned at a desired distance above the surface of the ground. As the harvester is drawn along a row of plants the knife 18 encounters the tops of the beets and as the cams 29 rotate the hangers 17 are moved in forward directions with relation to the yoke 5 and thus the tops of the beets are removed from the bodies thereof by shearing cuts which avoid the liability of slitting or tearing the bodies of the beets. Prior to the engagement of the knife 18 with the tops of the beets one of the teeth 27 or several of the said teeth have engaged the tops of the beets and thus the cylinder 26 and the shaft 19 are held at a proper distance above the body portions of the beets. The yoke 5 is capable of movement against the tension of the springs 9. Therefore the knife 18 cuts at a uniform distance below the upper end of the beets irrespective of the position of the beet in the ground. Furthermore when the top has been severed from the body of the beet the teeth 27 which are in engagement with the top of the beet will throw the same in a backward direction and the said tops thus passed rearwardly may be swept to one side by a scraper provided upon the frame 1 and which is not shown in the present illustration.

It will be seen that the gage member is positively connected with one of the traction wheels of the harvester and therefore it is impossible for the said gage members to become choked by the accumulation of tops or other vegetable matter and the said gage member is constantly rotated irrespective of its position above the surface of the ground. Furthermore the disks 28 located at the ends of the cylinder 26 will cut and prevent the material from accumulating at the ends of the blade 18 and this further facilitates the operation of the gage member and topper.

It is to be understood that the yoke 5 will yield against the tension of its springs 9 when the gage member is passing over beet tops or other projections under the gage member but, should the said springs 9 not yield with sufficient promptness, the springs 20 will yield to allow the gage member to shift upwardly independently of the yoke.

Having described the invention what I claim as new and desire to secure by Letters Patent is:—

1. In a beet harvester, a revoluble gage member mounted for up and down movement, an oscillatory cutting blade movable upwardly and downwardly with the gage member, and means revoluble with the gage member for oscillating said blade during the rotation of the gage member.

2. In a beet harvester, a revoluble gage member mounted for up and down movement, a pivotally supported cutting blade movable upwardly and downwardly with the gage member, and means revoluble with the gage member for oscillating the blade.

3. A beet harvester including a revoluble gage member mounted for up and down movement, a pivotally supported cutting blade located under the gage member, and means revoluble with the gage member for oscillating said blade.

4. A beet harvester including a vertically adjustable yoke, a spring pressed gage member revoluble within and movable with the yoke, a cutting blade supported from the yoke and extending under the gage member, and means revoluble with the gage member for oscillating the blade.

5. In a beet harvester, a gage member journaled for rotation, a yoke adjustably mounted and having guiding slots for the gage member, arms pivoted to the harvester and pivotally connected at their rear ends with said yoke, hangers pivotally connected at their upper ends with the arms, and a cutting blade attached to the lower ends of the hangers and located under the gage member.

6. A topper comprising a horizontally disposed main frame, bearing wheels for the frame, a yoke frame vertically reciprocable on the main frame, cutting means carried by the yoke frame and a gage member on the yoke frame operatively connected to the cutting means to operate the latter.

In testimony that I claim the foregoing as my own, I have hereto affixed my signature in the presence of two witnesses.

GEORGE A. PINGREE.

Witnesses:
W. L. POLLARD,
A. G. GREEN.